United States Patent
Theuss et al.

(10) Patent No.: US 12,228,728 B2
(45) Date of Patent: Feb. 18, 2025

(54) MIRROR SYSTEMS

(71) Applicant: Infineon Technologies AG, Neubiberg (DE)

(72) Inventors: Horst Theuss, Wenzenbach (DE); Klaus Elian, Alteglofsheim (DE); Cyrus Ghahremani, Regensburg (DE)

(73) Assignee: Infineon Technologies AG, Neubiberg (DE)

( * ) Notice: Subject to any disclaimer, the term of this patent is extended or adjusted under 35 U.S.C. 154(b) by 485 days.

(21) Appl. No.: 17/659,749

(22) Filed: Apr. 19, 2022

(65) Prior Publication Data
US 2022/0373784 A1 Nov. 24, 2022

(30) Foreign Application Priority Data
May 6, 2021 (DE) .......................... 102021111902.2

(51) Int. Cl.
| | |
|---|---|
| *G02B 26/08* | (2006.01) |
| *G02B 7/182* | (2021.01) |
| *G02B 26/10* | (2006.01) |
| *G02B 27/14* | (2006.01) |

(52) U.S. Cl.
CPC ....... *G02B 26/0833* (2013.01); *G02B 7/1821* (2013.01); *G02B 26/101* (2013.01); *G02B 27/14* (2013.01)

(58) Field of Classification Search
CPC ............. G02B 26/0833; G02B 7/1821; G02B 26/101; G02B 27/14
USPC ........................................................ 359/291
See application file for complete search history.

(56) References Cited

U.S. PATENT DOCUMENTS

| | | | |
|---|---|---|---|
| 2009/0008669 A1 | 1/2009 | Maeda et al. | |
| 2019/0293923 A1 | 9/2019 | Ghahremani et al. | |
| 2020/0209615 A1 | 7/2020 | Lee et al. | |
| 2020/0232610 A1* | 7/2020 | Raring | F21K 9/68 |
| 2020/0284883 A1* | 9/2020 | Ferreira | H04N 25/773 |
| 2021/0278584 A1* | 9/2021 | Rudy | G02B 6/002 |
| 2021/0278684 A1* | 9/2021 | Garan | G02B 27/283 |
| 2023/0288695 A1* | 9/2023 | Brockmeier | G02B 26/0833 |
| 2023/0288895 A1* | 9/2023 | Kauffmann | G06Q 10/06 |

FOREIGN PATENT DOCUMENTS

| | | |
|---|---|---|
| DE | 102017118776 A1 | 2/2019 |
| DE | 102019105703 A1 | 9/2019 |
| DE | 112019002260 T5 | 1/2021 |
| JP | 2005-181566 A | 7/2005 |

(Continued)

*Primary Examiner* — Mohammed A Hasan
(74) *Attorney, Agent, or Firm* — Harrity & Harrity, LLP (57) ABSTRACT

One example implementation of a mirror system comprises a carrier, and a first chip package arranged on a surface of the carrier and comprising a first MEMS mirror. Furthermore, the mirror system comprises a second chip package arranged on the surface of the carrier and comprising a second MEMS mirror. The mirror system furthermore comprises a reflective element arranged over the surface of the carrier and above the first chip package and the second chip package in such a way that a radiation that is incident in the mirror system and is reflected by the first MEMS mirror in the direction of the reflective element is reflected by the reflective element in the direction of the second MEMS mirror.

20 Claims, 10 Drawing Sheets

(56) References Cited

FOREIGN PATENT DOCUMENTS

| | | |
|---|---|---|
| KR | 10-2010-0055200 A | 5/2010 |
| WO | 2006/035378 A1 | 4/2006 |
| WO | 2012/000556 A1 | 1/2012 |

* cited by examiner

MIRROR SYSTEMS

CROSS REFERENCE TO RELATED APPLICATION

This application claims priority to German Patent Application No. 102021111902.2 filed on May 6, 2021, the content of which is incorporated by reference herein in its entirety.

TECHNICAL FIELD

Example implementations are concerned with mirror systems.

BACKGROUND

Methods such as LIDAR (abbreviation of light detection and ranging) are employed in autonomous driving, such that vehicles can perceive objects in the surroundings. LIDAR methods are based on a distance measurement by way of determining the time of flight of a light beam that is emitted into the surroundings and is detected by sensors after reflection at the object.

SUMMARY

Example implementations are concerned with mirror systems. The mirror system comprises a carrier, and a first chip package arranged on a surface of the carrier and comprising a first MEMS mirror. Furthermore, the mirror system comprises a second chip package arranged on the surface of the carrier and comprising a second MEMS mirror. The mirror system furthermore comprises a reflective element arranged over the surface of the carrier and above the first chip package and the second chip package in such a way that a radiation that is incident in the mirror system and is reflected by the first MEMS mirror in the direction of the reflective element is reflected by the reflective element in the direction of the second MEMS mirror. By combining different tilt angles of the MEMS mirrors, it is possible for the incident radiation to be projected onto surroundings of the mirror system two-dimensionally using the mirror system. The proposed concept can enable a simple, planar arrangement of the MEMS mirrors (e.g., on a cost-effective carrier for mirror systems). A more robust mirror system can be implemented using individual chip packages with integrated MEMS mirrors.

BRIEF DESCRIPTION OF THE DRAWINGS

Some examples of devices and/or methods are explained in greater detail merely by way of example below with reference to the accompanying figures, in which.

DETAILED DESCRIPTION

Some examples will now be described more thoroughly with reference to the accompanying figures. However, further possible examples are not restricted to the features of these implementations described in detail. These may have modifications of the features and counterparts and alternatives to the features. Furthermore, the terminology used herein for describing specific examples is not intended to be limiting for further possible examples.

Throughout the description of the figures, identical or similar reference signs refer to identical or similar elements or features which can be implemented in each case identically or else in modified form, while they provide the same or a similar function. In the figures, furthermore, the thicknesses of lines, layers and/or regions may be exaggerated for elucidation purposes.

If two elements A and B are combined using an "or", this should be understood such that all possible combinations are disclosed, e.g. only A, only B, and A and B, unless expressly defined otherwise in an individual case. As alternative wording for the same combinations, it is possible to use "at least one from A and B" or "A and/or B". That applies equivalently to combinations of more than two elements.

If a singular form, e.g. "a, an" and "the" is used and the use of only a single element is defined neither explicitly nor implicitly as obligatory, further examples can also use a plurality of elements in order to implement the same function. If a function is described below as being implemented using a plurality of elements, further examples can implement the same function using a single element or a single processing entity. Furthermore, it goes without saying that the terms "comprises", "comprising", "has" and/or "having" in their usage describe the presence of the specified features, integers, steps, operations, processes, elements, components and/or a group thereof, but do not exclude the presence or the addition of one or more other features, integers, steps, operations, processes, elements, components and/or a group thereof.

For LIDAR methods, mirror systems can be used, for example, in order to scan an object or surroundings two-dimensionally. The systems comprise mirrors, each of which can be inclined in two different directions. By combining various states (with different angles of inclination) of the mirrors, it is possible, using the mirror system, for a light beam to scan a surface point by point in each case over a plurality of lines, for example.

In order to enable a scan, a suitable arrangement of the mirrors is required, such that the light beam can be reflected between the mirrors and into surroundings of the mirror system. A conventional arrangement is, for example, that the light beam is reflected by a first mirror directly onto a mirror perpendicular thereto. Smaller dimensions cannot be attained, or can be attained only in a restricted way, for such mirror systems. Furthermore, the production of such mirror systems is often associated with a high complexity or high costs.

Moreover, existing mirror systems are often sensitive to external disturbing or environmental fluences. Over the course of time this becomes apparent (e.g., by virtue of a shortened lifetime or by virtue of a decreasing accuracy).

Some implementations described herein are related to providing improved mirror systems in order to be able to implement mirror systems more efficiently, more compactly, more simply, more cost-effectively or more robustly.

Figure 1:
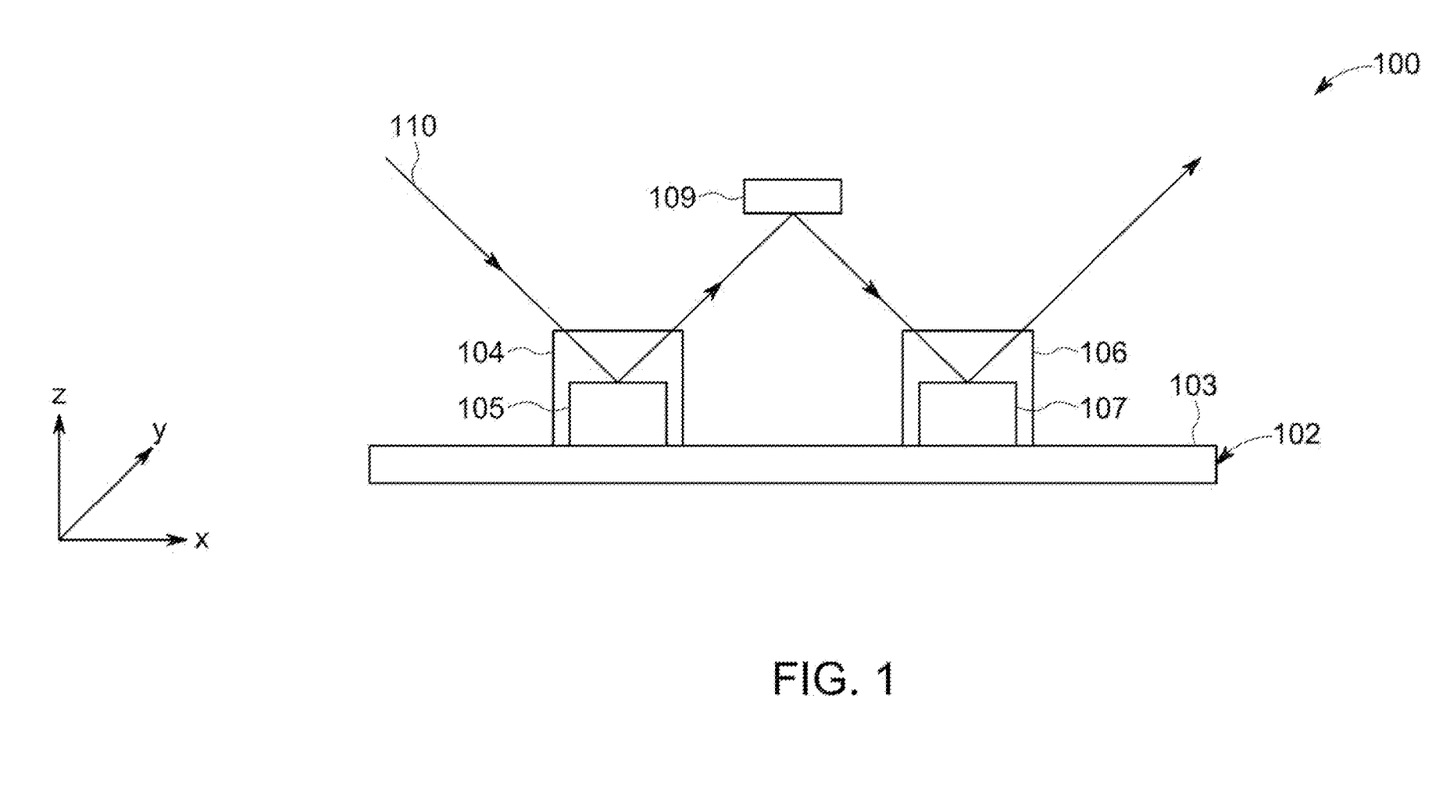
FIG. 1 shows one example implementation of a mirror system.

FIG. 1 shows one example implementation of a mirror system 100 comprising a carrier 102. The carrier 102 has a surface 103. The mirror system 100 comprises a first chip package 104 arranged on the surface 103 of the carrier 102 and comprising a first MEMS mirror 105. Furthermore, the mirror system 100 comprises a second chip package 106 arranged on the surface 103 of the carrier 102 and comprising a second MEMS mirror 107. The mirror system 100 furthermore comprises a reflective element 109 arranged over the surface 103 of the carrier 102 and above the first chip package 104 and the second chip package 106 in such a way that a radiation 110 that is incident in the mirror system 100 and is reflected by the first MEMS mirror 105 in the direction of the reflective element 109 is reflected by the reflective element 109 in the direction of the second MEMS mirror 107.

The carrier 102 can make available an area onto which the first and second chip packages 104, 106 can be arranged (e.g., next to one another). The chip packages 104, 106 comprise MEMS mirrors 105, 107, which can reflect radiation that is incident in the chip package. The chip packages 104, 106 can respectively protect the MEMS mirrors 105, 107 against surroundings outside the chip packages 104, 106 (or outside the mirror system 100). Each chip package 104, 106 can comprise at least one part through which incident radiation can enter and emerge after reflection at the MEMS mirror 105, 107. The first MEMS mirror 105 can reflect the radiation 110 that is incident in the mirror system in the direction of the reflective element 109. The reflective element 109, such as e.g. a mirror, can reflect the reflected incident radiation in the direction of the second MEMS mirror 107. The second MEMS mirror 107 can in turn reflect this reflected incident radiation into surroundings of the mirror system 100. The MEMS mirrors 105, 107 in the respective chip packages 104, 106 can be mounted in such a way that the first MEMS mirror 105 and the second MEMS mirror 107 can be tilted in different directions. By combining different tilt angles of the MEMS mirrors 105, 107, it is possible for the incident radiation 110 to be projected two-dimensionally by the mirror system 100. By virtue of the arrangement in accordance with the proposed concept, the mirror system 100 can be implemented with a lower complexity and outlay and/or with smaller dimensions. The mirror system 100 can have more cost-effective components (e.g., for the carrier). By virtue of the arrangement of the MEMS mirrors 105, 107 in the chip packages 104, 106, the mirror system 100 can be less sensitive to external influences. As a result, the mirror system 100 can be operated for longer and/or with fewer fluctuations (with regard to the projection).

The first MEMS mirror 105 and the second MEMS mirror 107 can be similar or identical. A MEMS mirror 105, 107 can be a micromirror that is implemented, for example, on or in a semiconductor chip, and is driven by (microelectro-mechanical) actuators in the semiconductor chip (referred to as a microelectromechanical system, MEMS). The MEMS mirror 105, 107 can generally be any object (e.g., with a coating) at which an incident radiation can be reflected. The MEMS mirrors 105, 107 can be mounted movably in the chip packages 104, 106.

For example, the first MEMS mirror 105 can be mounted rotatably about a first axis. The first axis can be oriented parallel to the surface 103 of the carrier 102. The rotatably mounted first MEMS mirror 105 can be tilted (rotated, pivoted or inclined) about the first axis (e.g. along the x-axis). A radiation 110 that is incident on the first MEMS mirror 105 can be reflected or deflected at different tilt angles of the first MEMS mirror 105 in various directions along a line (e.g. vertically, perpendicularly with respect to the first axis). As a result, a radiation 110 that is incident in the first chip package 104 can be reflected at different emergence angles (along the line) with respect to the reflective element 109. The first MEMS mirror 105 can be referred to as a 1D MEMS mirror and can reflect a radiation 110 that is incident in the first chip package 104 in relation to a first dimension.

The second MEMS mirror 107 (and/or the second chip package 106) can be embodied similarly or identically to the first MEMS mirror 105 (and/or the first chip package 104). The second MEMS mirror 107 (and/or the second chip package 106) can be arranged on the carrier 102 with a different orientation in relation to the first MEMS mirror 105 (and/or the first chip package 104), such as e.g. in a rotated manner (about an axis perpendicular to the surface 103 of the carrier 102). For example, the second MEMS mirror 107 can be mounted rotatably about a second axis (e.g. along the y-axis), wherein the second axis is oriented parallel to the surface 103 of the carrier 102 and perpendicular to the first axis. The rotatably mounted second MEMS mirror 107 can be tilted (rotated, pivoted or inclined) about the second axis. The second MEMS mirror 107 can reflect into surroundings of the mirror system 100 the incident radiation that is (or was) reflected by the reflective element 109 in the direction of the second MEMS mirror 107. The radiation 110 that is incident on the second MEMS mirror 107 can have various angles of incidence along a line (in accordance with the tilt angles of the first MEMS mirror 105). The incident radiation can be reflected or deflected at different tilt angles of the second MEMS mirror 107 in various directions along a line (horizontally, perpendicularly with respect to the second axis). As a result, a radiation that is incident in the second chip package 106 can be reflected at various emergence angles (along the line) outside the mirror system 100. The radiation 110 that is incident in the mirror system can be projected into surroundings of the mirror system 100 two-dimensionally using oscillation of the two MEMS mirrors 105, 107.

Surroundings of the mirror system 100 can be defined by the surroundings of the first and/or second chip package 104, 106. In some implementations, the surroundings can be defined by a region outside a housing or an outer (maximum) dimension of the mirror system.

The chip packages 104, 106 can protect the MEMS mirrors 105, 107 against an external influence. For example, the first and second chip packages 104, 106 can hermetically seal respectively the first and second MEMS mirrors 105, 107. The oscillation of the mirrors can be made possible as a result. The first and second chip packages 104, 106 can each comprise a transparent cover, incident radiation being able to penetrate to the MEMS mirror through the transparent cover and radiation reflected by the MEMS mirror being able to penetrate through the transparent cover. The transparent cover can have a surface that is inclined with respect to the surface of the carrier. The transparent cover can be produced, for example, from glass or a polymer at the wafer or chip level. The transparent cover can be embodied in such a way that incident radiation (and/or radiation that leaves the chip package) can better (e.g., in focused fashion, in filtered fashion) reach the MEMS mirror 105, 107 or leave the chip package 104, 106 after reflection at the MEMS mirror 105, 107.

In some implementations, the chip package 104, 106 could have openings through which radiation can enter the chip package 104, 106 and emerge from the chip package 104, 106. A chip package 104, 106 having openings could protect the MEMS mirrors for example against a mechanical influence from outside.

The reflective element 109 can be arranged over the carrier 102 and above the first and second chip packages 104, 106. The reflective element 109 can be arranged in a direction perpendicular to the surface 103 of the carrier 102 in such a way that the reflective element 109 is situated over an outer dimension of the first and second chip packages 104, 106 in this direction. The mirror system 100 can comprise a structure on which the reflective element is arranged. The structure enables the reflective element 109 to be arranged over the carrier 102 and above the chip packages 104, 106. The reflective element 109 can be, for example, a mirror and reflect radiation reflected by the first MEMS mirror 105 in the direction of the second MEMS mirror 107. For a suitable reflection, the reflective element 109 can have a specific shape. For example, the reflective element 109 can have a curved shape. The reflective element 109 can have a plurality of (e.g., partly transmissive) layers for a multiple reflection. The reflective element 109 can be arranged on a side situated opposite the surface 103 of the carrier 102. Generally, the reflective element 109 can be arranged in such a way that a radiation 110 that is incident in the mirror system can be projected into the surroundings of the mirror system 100 two-dimensionally by chip packages 104, 106 (comprising MEMS mirrors) arranged next to one another. In accordance with FIG. 1, the reflective element 109 can have a reflective surface facing the surface 103 of the carrier 102. Unlike in the illustration in FIG. 1, it is possible for example for the reflective element 109 to be arranged directly over the first or second chip packages 104, 106. In some implementations, the surface of the reflective element 109 could be inclined relative to the surface 103 of the carrier 102, provided that the reflective element 109 can receive the radiation reflected by the first MEMS mirror 105 and reflect it in the direction of the second MEMS mirror 107.

The carrier 102 of the mirror system 100 can make available a surface 103 for arranging the first chip package 104 and the second chip package 106. The carrier 102 can be produced, for example, from ceramic or glass. The carrier 102 could comprise electrical contacts for coupling the first and second chip packages 104, 106 to a device (e.g. for driving the MEMS mirrors). The carrier 102 could be, for example, a substrate, a printed circuit board, a circuit board or generally a grid, framework or a frame (lead frame) for coupling a die in the chip package to a device outside the chip package. The surface 103 of the carrier 102 can be e.g. a placement side of a printed circuit board. The first chip package 104 and the second chip package 106 can be arranged next to one another on the surface 103 of the carrier 102. Chip packages 104, 106 arranged next to one another can cover mutually different portions of the surface 103 of the carrier 103. Mirror systems having chip packages arranged next to one another can enable a simpler, more compact, most cost-effective implementation of mirror systems.

The radiation that is incident in the mirror system 100 can be generated by a laser. The incident radiation can be, for example, visible light, infrared (IR) radiation, or ultraviolet (UV) radiation. Using the mirror system 100, the radiation 110 that is incident in the mirror system can be projected two-dimensionally (e.g., onto an object outside the mirror system).

The mirror system 100 can be used for projecting an image representation, for scanning, probing or recognizing an object, for determining a distance or a position of an object. The mirror system 100 can be used, for example, in combination with a sensor for LIDAR methods. For example, an object can reflect a radiation generated by the mirror system. The radiation reflected by the object can be received by the mirror system. Using the time of flight method (TOF), a 3D map of the surface of the object can be generated. The mirror system can be used in vehicles (e.g., distance measurement, autonomous driving, head-up display), for mobile devices (e.g., smartphones or tablets), for virtual reality (VR) glasses, for augmented reality (AR), robot technology, for games, or for further applications (home furnishings and decoration, travel guides).

Further details and optional aspects of the mirror system 100 are described in association with the proposed concept or one or more of the examples described below.

Figure 2:
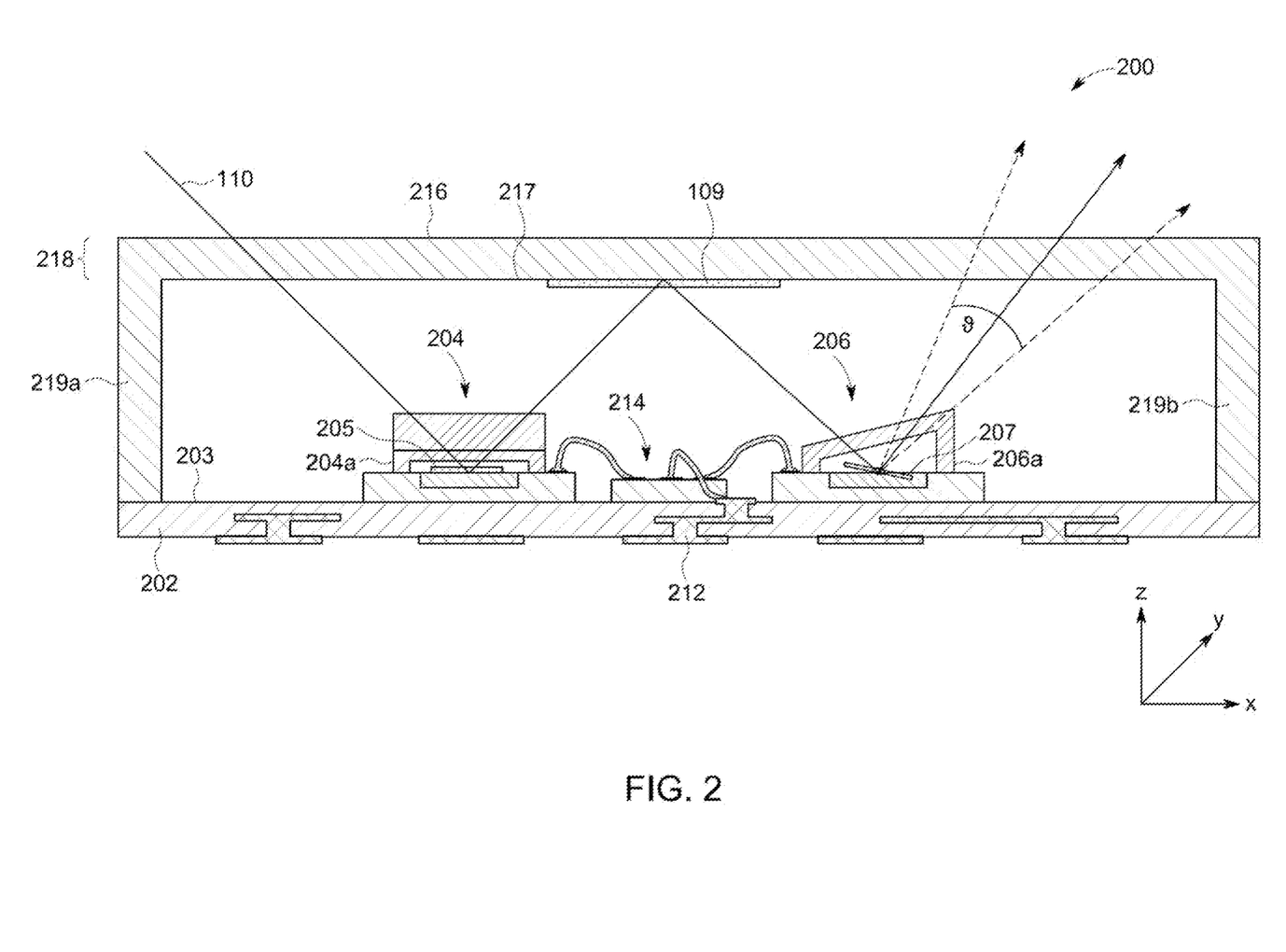
FIG. 2 shows a further example implementation of a mirror system.

FIG. 2 shows a further example implementation of a mirror system 200. The mirror system 200 can be implemented in a manner similar to the mirror system described in association with FIG. 1. The mirror system 200 comprises a first chip package 204 with a first MEMS mirror 205, which is mounted rotatably about the x-axis, and a second chip package 206 with a second MEMS mirror 207, which is mounted rotatably about the y-axis. The MEMS mirrors 205, 207 are hermetically sealed in the chip packages 204, 206. The chip packages 204, 206 have a transparent cover 204a, 206a having an inclined surface, through which radiation can penetrate.

The mirror system 200 has a carrier 202 having a surface 203, on which carrier the chip packages 204 and 206 are arranged next to one another. The carrier 202 comprises structures 212 (e.g. plated-through holes, contacts, connections or wires) for electrical connections or for connecting the carrier 202 to some other substrate (e.g. printed circuit board). The structures 212 can extend from one side (e.g. surface 203) of the carrier 202 partly or completely as far as an opposite side (e.g. underside) of the carrier.

The mirror system 200 furthermore comprises at least one control unit 214 arranged on the surface 203 of the carrier 202 and configured to control at least one orientation of the first MEMS mirror 205 or of the second MEMS mirror 207. The control unit 214 can drive for example components in the chip packages 204, 206, such as, for example, MEMS actuators, in order to orient the MEMS mirror 205, 207 for a 2D projection. By way of example, the control unit 214 can effect driving for pivoting the first MEMS mirror 205 with a first frequency and for pivoting the second MEMS mirror 207 with a second frequency. As illustrated in FIG. 2, the incident radiation 110 can leave the mirror system 200 at different emergence angles $\vartheta$ (shown for one dimension). The control unit 214 can have connections, such as wires, for example, which are connected to a (semiconductor) die of the chip package 204, 206. The control unit can, for example, be an integrated circuit and optionally comprise further electrical components (e.g., for driving a radiation source situated in a mirror system). In some implementations, the mirror system 200 can comprise a separate control unit for each chip package 204, 206.

Furthermore, the mirror system 200 shown in FIG. 2 comprises a housing 216 arranged on the surface 203 of the carrier 202 and surrounding the first chip package 204, the second chip package 206 and the reflective element 109. The housing 216 can provide an enclosure or a casing for the chip packages 204, 206, the reflective element 109 and optionally the control unit. The housing 216 arranged on the surface 203 of the carrier 202 can have a cavity, in which the chip packages 204, 206, the reflective element 109 and optionally the control unit 214 are situated.

The housing 216 can protect the chip packages 204, 206 against surroundings of the mirror system 200 that may be situated outside the housing 216. The housing can reduce or avoid, for example, a substance exchange with the surroundings and/or a mechanical influence on the chip packages from outside. The incident radiation 110 can penetrate through the housing 216 and reach the first MEMS mirror 205 and emerge from the housing 216 after reflection (at the second MEMS mirror 207) in the mirror system 200. The housing 216 can be embodied in such a way that entering and emerging radiation can penetrate through the housing 216 better (e.g., through integrated optical elements or coatings) or can reach the MEMS mirrors better.

As shown by way of example in FIG. 2, the reflective element 109 can be arranged on an inner side 217 of the housing 216. The inner side 217 can be embodied on an upper surface 218 of the housing 216. For example, the upper surface 218 can be embodied parallel to the surface 203 of the carrier 202. The upper surface 218 can be carried by side walls 219a-b of the housing 216. The inner side 217 can face the surface 203 of the carrier 202. The housing 216 can provide a structure for arranging the reflective element 109 over the carrier 202 and above the first and second chip packages 204, 206. In some implementations, the MEMS mirrors 205, 207 can be implemented in a common housing 216 and on a common plane. In some implementations, a complex 3D arrangement of MEMS mirrors could be avoided. The mirror system can be integrated, for example, into LIDAR systems for example more simply or with lower complexity and costs. The mirror system can have smaller dimensions and can be used for applications which were not accessible on account of the design of previous mirror systems.

The reflective element 109 can be for example a mirror, a reflector, or a reflective coating (e.g., composed of metal). The reflective element 109 can be a part of the housing 216, provided that at least this part of the housing has (sufficiently) reflective properties by virtue of its constitution. The incident radiation could be (partly) polarized or depolarized as a result of reflection at the reflective element 109.

The housing 216 can be produced (e.g., molded, cast) or constituted from one or more (arbitrary) materials, provided that radiation can penetrate through the housing 216 for a 2D imaging of the incident radiation. For example, the housing 216 of the mirror system 200 as shown in FIG. 2 can be completely transparent. Incident radiation 110 in a wavelength range or of a specific type (e.g., light beams and/or IR beams) could penetrate through the transparent housing 216. The housing 216 can be produced from glass or a polymer and can optionally be coated (e.g. antireflection coating, filter). In some implementations (cf. FIGS. 5 to 9), the housing can be nontransparent and have regions through which radiation can penetrate.

Further details and optional aspects of the mirror system 200 are described in association with the proposed concept or one or more of the examples described above or below.

The housing of the mirror system can have regions with specific features. For example, the housing can have a first region, through which incident radiation can enter the mirror system, and can have a second region, through which incident radiation that was reflected by the mirror system can emerge from the mirror system. The first and second regions can have portions that are optimized locally in the housing, such that radiation can penetrate through the housing better or can reach the MEMS mirrors better. The regions of the housing are explained in greater detail below in accordance with further example implementations.

Figure 3:
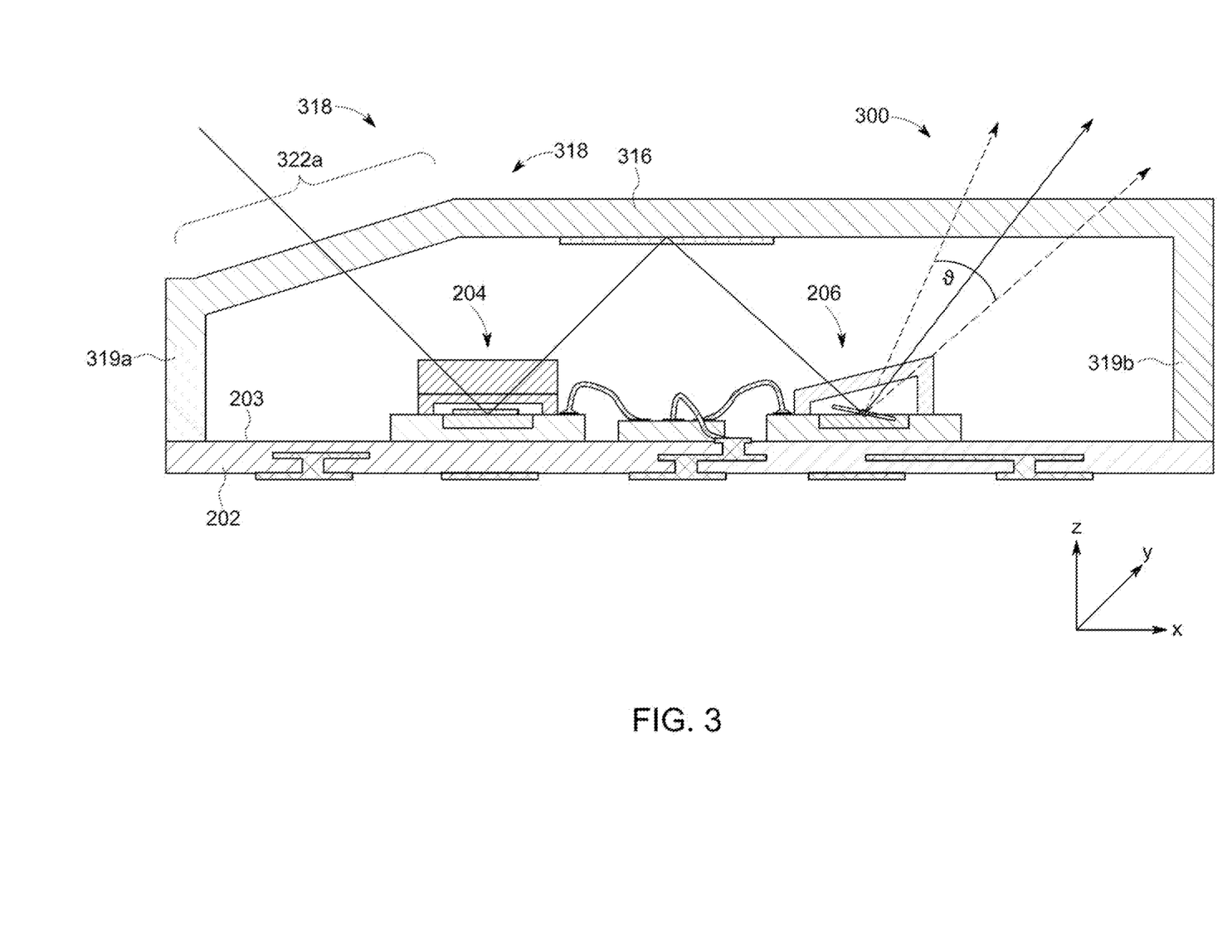
FIG. 3 shows a further example implementation of a mirror system.

FIG. 3 shows one example implementation of a mirror system 300 which can be embodied in a manner similar to the mirror systems described in association with FIGS. 1 and/or 2. The mirror system 300 has a housing 316 having an upper surface 318 carried by side walls 319a-b of the housing 316. The upper surface 318 comprises a first region 322a, through which incident radiation can enter the mirror system 300. Alternatively or additionally, the upper surface 318 can comprise a second region (not shown in FIG. 3), which can be embodied in a manner similar to the first region 322a of the mirror system 300 and through which incident radiation that was reflected by the mirror system 300 can emerge from the mirror system 300. Explanations hereinafter that concern the first region can analogously or similarly apply to a second region.

As shown in FIG. 3, the upper surface 318 of the housing 316 excluding the (at least) first region (or second region) can be embodied parallel to the surface 203 of the carrier 202. The first region 322a can have an area which can form an angle of e.g. more than 20°, more than 30° or more than 40° with the surface 203 of the carrier 202. The angle can be coordinated with a position of the first MEMS mirror (or with a position of the second MEMS mirror in the case of a second region). Incident radiation could be reflected to a lesser extent at an inclined surface of the region 322a, and thereby reach the first MEMS mirror better. The first region can have a different angle of inclination (than that illustrated), a different (e.g. concave or convex) shape and/or further optical features (e.g., filter, antireflection coating, ground section for focusing onto the MEMS mirror).

Further details and optional aspects of the mirror system 300 are described in association with the proposed concept or one or more of the examples described above or below.

Figure 4:
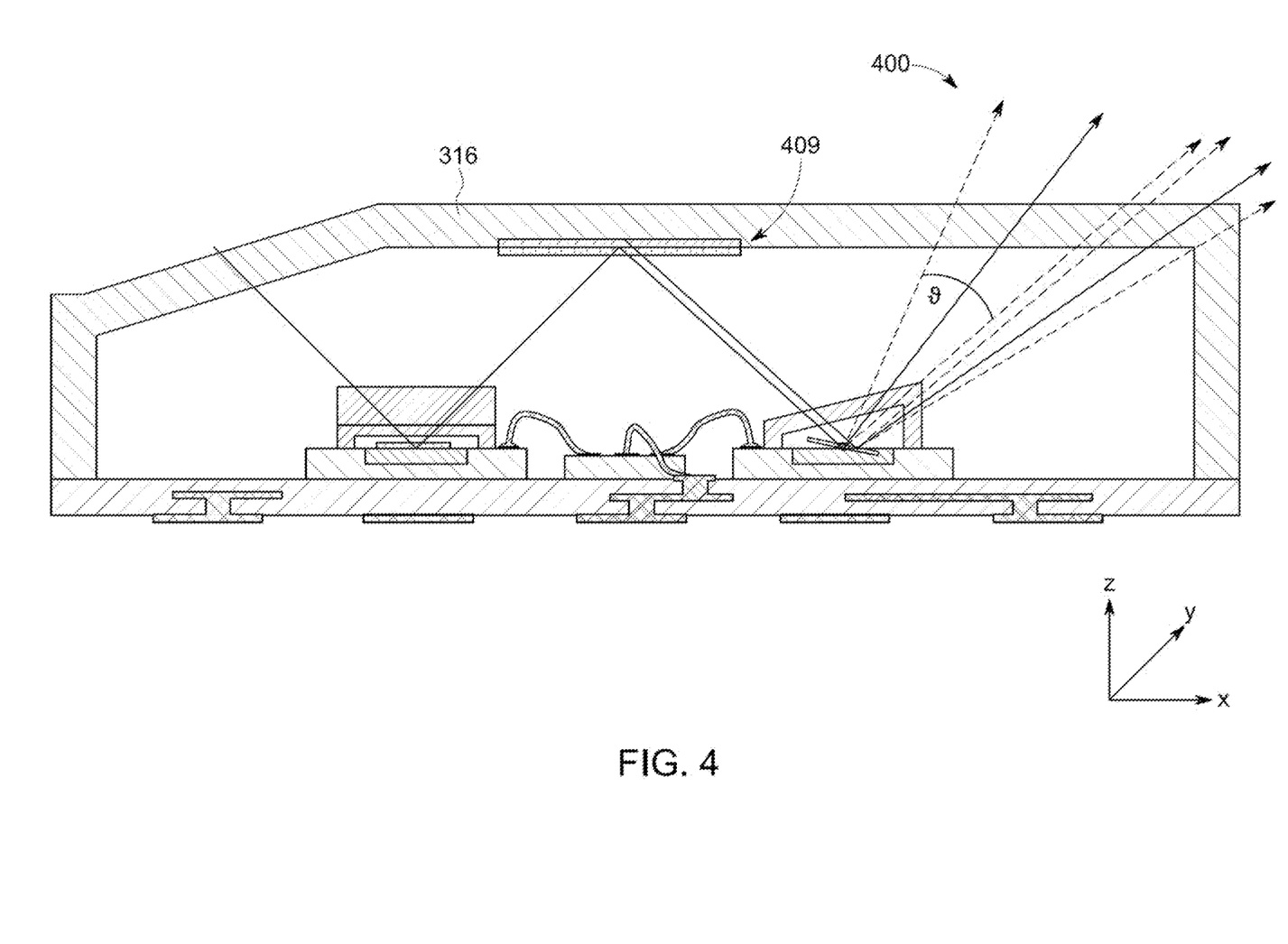
FIG. 4 shows a further example implementation of a mirror system.

FIG. 4 shows one example implementation of a mirror system 400 which can be implemented in a manner similar to the mirror systems described in association with FIGS. 1 through 3. The mirror system 400 comprises a reflective element 409 on the inner side of the housing 316. The reflective element 409 has at least one partly transmissive layer, such that the radiation that is incident in the reflective element 409 is split into at least two beams by multiple reflection at the reflective element 409. As illustrated by way of example, the partly transmissive layer can be arranged on a further layer of the reflective element 409. One portion of the incident radiation 110 (reflected at the first MEMS mirror) can be reflected at the partly transmissive layer in the direction of the second MEMS mirror. Another portion of the incident radiation 110 (reflected at the first MEMS mirror) can pass through the partly transmissive layer and be reflected at the further layer in the direction of the second MEMS mirror. Beam doubling can be achieved as a result. In some implementations, the reflective element can have, for example, more than two, more than three, or generally a plurality of partly transmissive layers. As a result, the reflective element 409 can generate more than two beams by multiple reflection. With a reflective element 409 of this type, the radiation that is incident in the mirror system could be imaged more precisely or more rapidly by the mirror system 400.

Further details and optional aspects of the mirror system 400 are described in association with the proposed concept or one or more of the examples described above or below.

Figure 5:
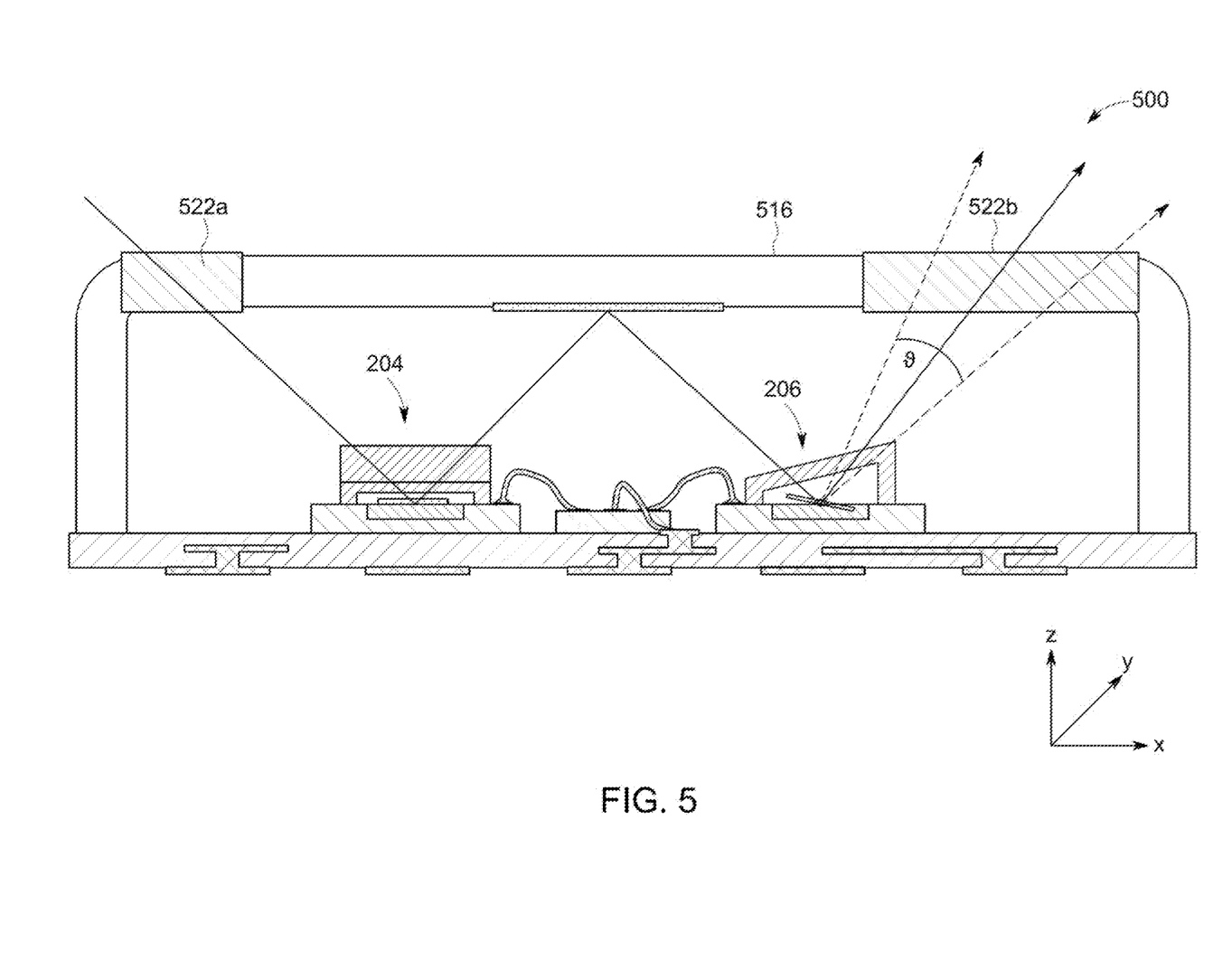
FIG. 5 shows a further example implementation of a mirror system.

FIG. 5 shows a further example implementation of a mirror system 500. The mirror system 500 can be implemented in a manner similar to the mirror systems described in association with FIGS. 1-4. In comparison with the mirror system in FIGS. 2-4, the mirror system 500 has a (predominantly) nontransparent housing 516 (e.g., composed of plastic, metal or ceramic).

As shown in FIG. 5, the first region 522*a* and/or the second region 522*b* of the housing 516 can consist of a transparent material. The regions 522*a-b* can be optical or generally radiation-transmissive windows. For example, the first and second regions 522*a-b* can be produced from glass or plastic. The regions 522*a-b* can comprise lenses, filters, coatings or other optical components which focus, (partly) filter, (partly) absorb, polarize incident radiation and/or reduce reflection or scattering. Optical elements of the first or second regions 522*a-b* can be integrated in the housing 516 in such a way that the components (chip packages, control unit) enclosed by the housing 516 are sealed. The (predominantly) nontransparent housing 516 with transparent regions 522*a-b* as shown in FIG. 5 can, for example, shield or reduce stray radiation from surroundings of the housing 516 and at the same time enable entrance and emergence of (specific) radiation. Furthermore, that part of the housing 516 which does not comprise the first and second regions 522*a-b* can be configured for a better shielding (mechanical, electromagnetic, thermal), stability or shape.

Further details and optional aspects of the mirror system 500 are described in association with the proposed concept or one or more of the examples described above or below.

Figure 6:
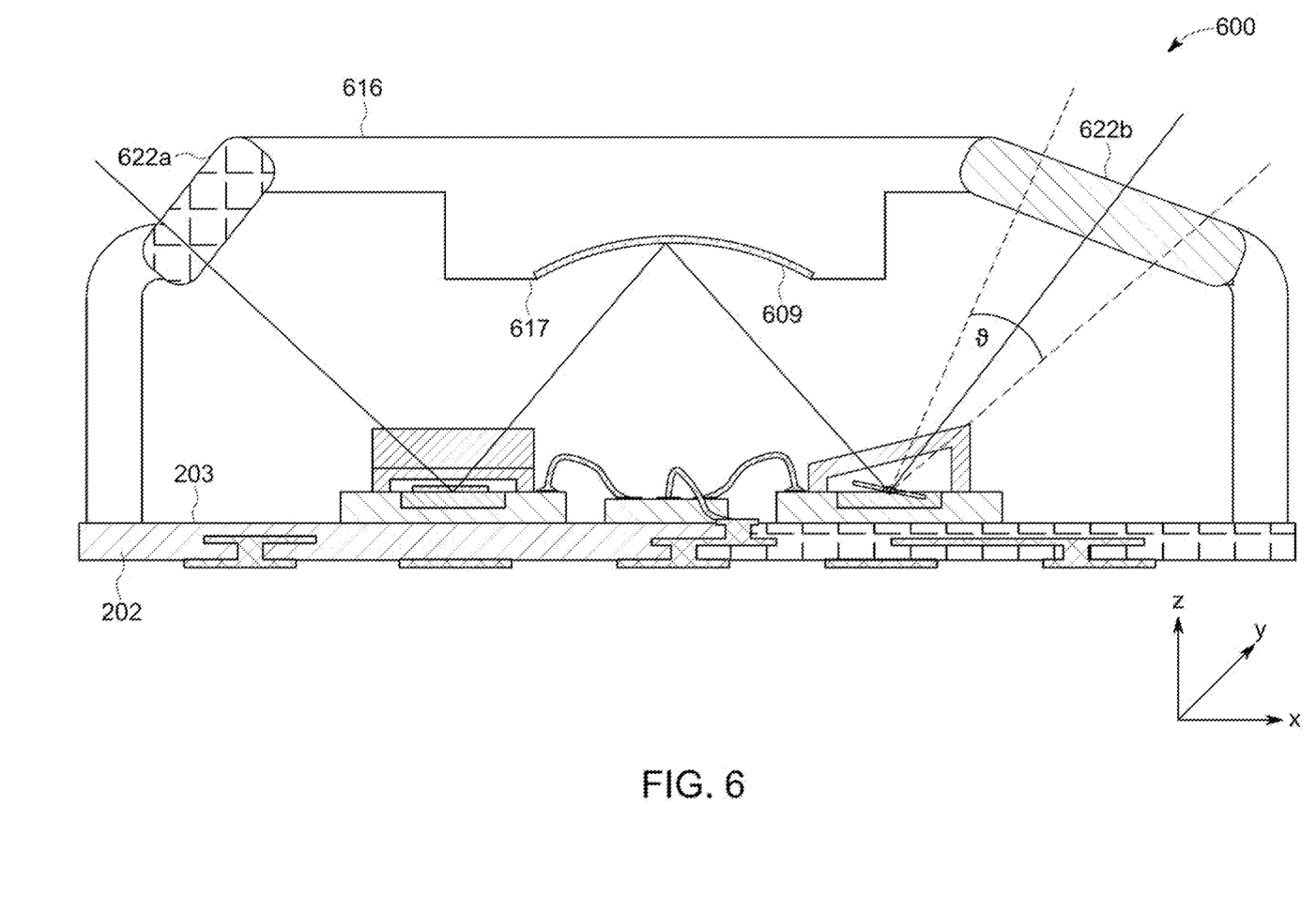
FIG. 6 shows a further example implementation of a mirror system.

FIG. 6 shows a further example implementation of a mirror system 600, which can be implemented in a manner similar to the mirror systems described in association with FIGS. 1 to 5. As shown in FIG. 6, the mirror system 600, in a manner similar to the mirror system 500 (FIG. 5), has a (predominantly) nontransparent housing 616 with transparent regions 622*a-b*. Furthermore, the mirror system 600 comprises aspects of the mirror system 300 described in association with FIG. 3. The regions 622*a-b* of the housing 616 can be embodied such that they are not parallel relative to the surface of the carrier. For example, a surface of the regions 622*a-b* can form an angle of more than 20°, more than 30° or more with the surface of the carrier.

In accordance with FIG. 6, at least one part of the inner side 617 of the housing 616 can have a curvature. The mirror system 600 can have a reflective element 609 embodied on the curved part of the inner side 617. For example, the reflective element 609 can be a (metal) coating on the curved part of the inner side 617. By virtue of the curvature, the reflective element 609 can be shaped in a manner similar to a lens. The curvature can be concave, as illustrated, or have some other shape, such that incident radiation can be better reflected by the first MEMS mirror in the direction of the second MEMS mirror.

Further details and optional aspects of the mirror system 600 are described in association with the proposed concept or one or more of the examples described above or below.

Figure 7:
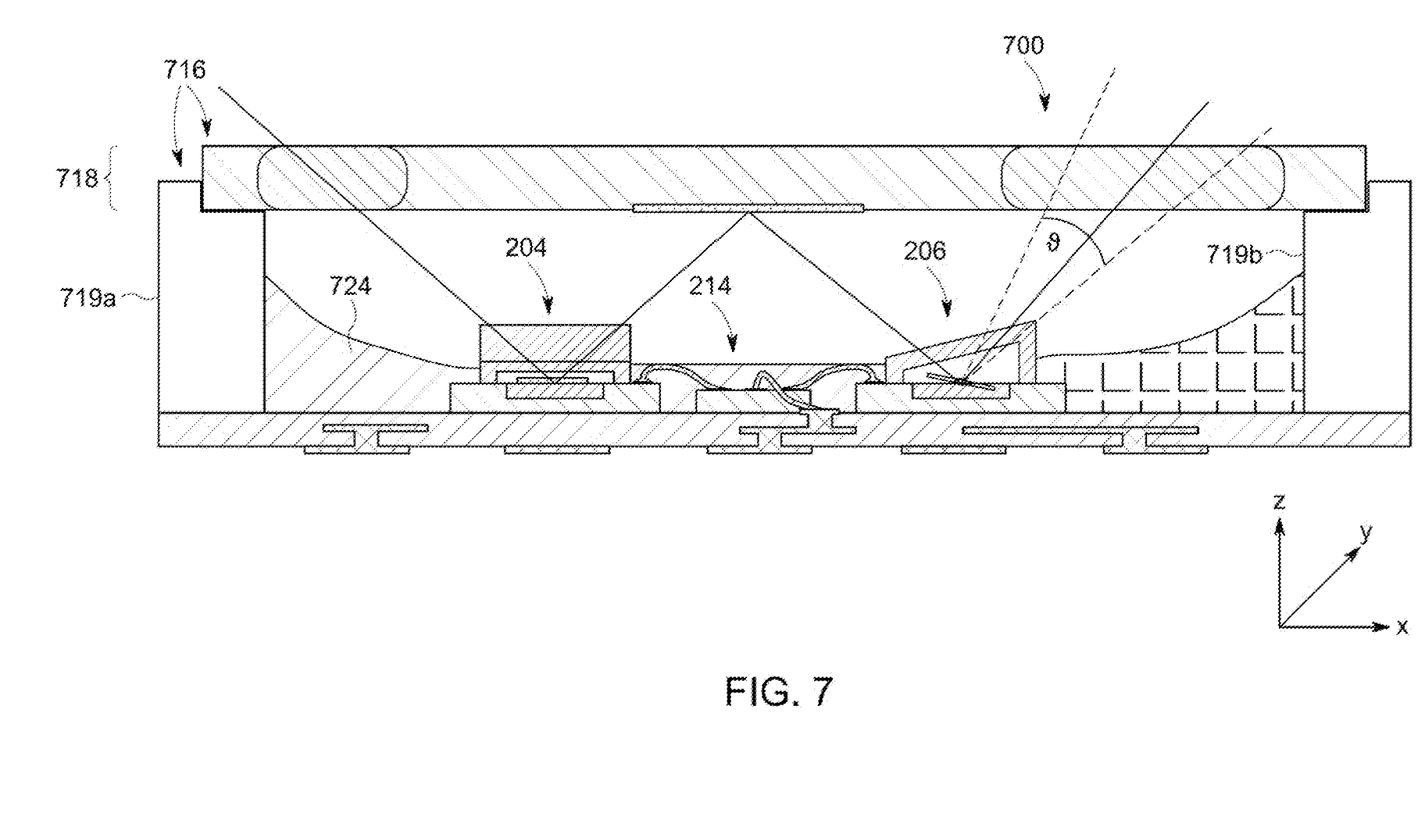
FIG. 7 shows a further example implementation of a mirror system.

FIG. 7 shows a further example implementation of a mirror system 700 which can be implemented in a manner similar to the mirror systems described in association with FIGS. 1-6. The housing of the mirror system 700 has an upper surface 718 carried by side walls 719*a-b*. The upper surface 718 can be a lid or a cover protecting the chip packages (e.g., against mechanical influence). In the case of the mirror system 700, a substance exchange could take place between an inner region of the housing 716 that comprises at least the chip packages and surroundings of the mirror system 700 that are outside an outer dimension of the housing 716.

The mirror system 700 comprises a medium 724 surrounding at least one part of the first chip package 204 and at least one part of the second chip package 206 in such a way that contacts of the chip package 204, 206 are protected against an influence by the surroundings of the mirror system 700. The medium 724 can protect electrical components of the chip packages 204, 206 and optionally of the control unit 214 (or of other integrated elements, such as e.g. a radiation source). The medium 724 (e.g., gel or viscous liquid) could be applied, spread, vapor-deposited or poured onto the contacts or electrical components. The medium 724 could lengthen the lifetime of mirror systems. The medium enables mirror systems to be less sensitive to external influences.

Further details and optional aspects of the mirror system 700 are described in association with the proposed concept or one or more of the examples described above or below.

Figure 8A:
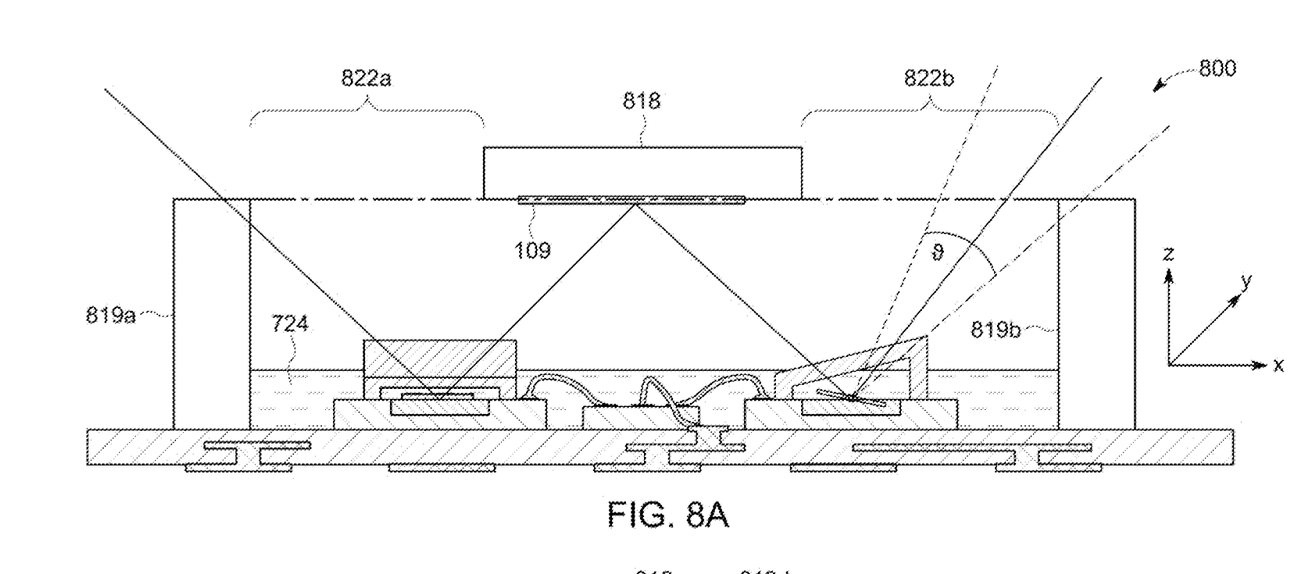
FIG. 8A shows a further example implementation of a mirror system.
Figure 8B:
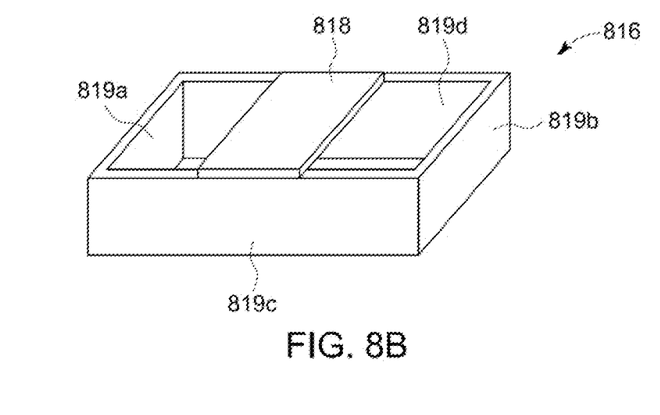
FIG. 8B shows one example of a housing of the mirror system shown in FIG. 8A.

In some implementations, the first region and/or the second region can each be openings in the housing. For example, the regions of the mirror systems 500, 600, 700 described in association with FIGS. 5-7 can be openings. FIG. 8A shows a further example implementation of a mirror system 800 with openings. FIG. 8B shows the housing 816 (without integrated components) of the mirror system 800 illustrated in FIG. 8A. The housing 816 of the mirror system 800 has an upper surface 818 carried by two (from a total of four 819*a-d*) side walls 819*c-d* of the housing. It is possible for the upper surface 818 not to cover the chip packages 204, 206 or to cover them only partly. The upper surface 818 of the housing 816 can be embodied in such a way that the reflective element 109 can be arranged over the surface of the carrier and above the first and second chip packages 204, 206. The mirror system 800 can have a medium 724, such that (open) contacts, wires or electrical components of at least the chip packages can be protected.

Further details and optional aspects of the mirror system 800 are described in association with the proposed concept or one or more of the examples described above or below.

Figure 9:
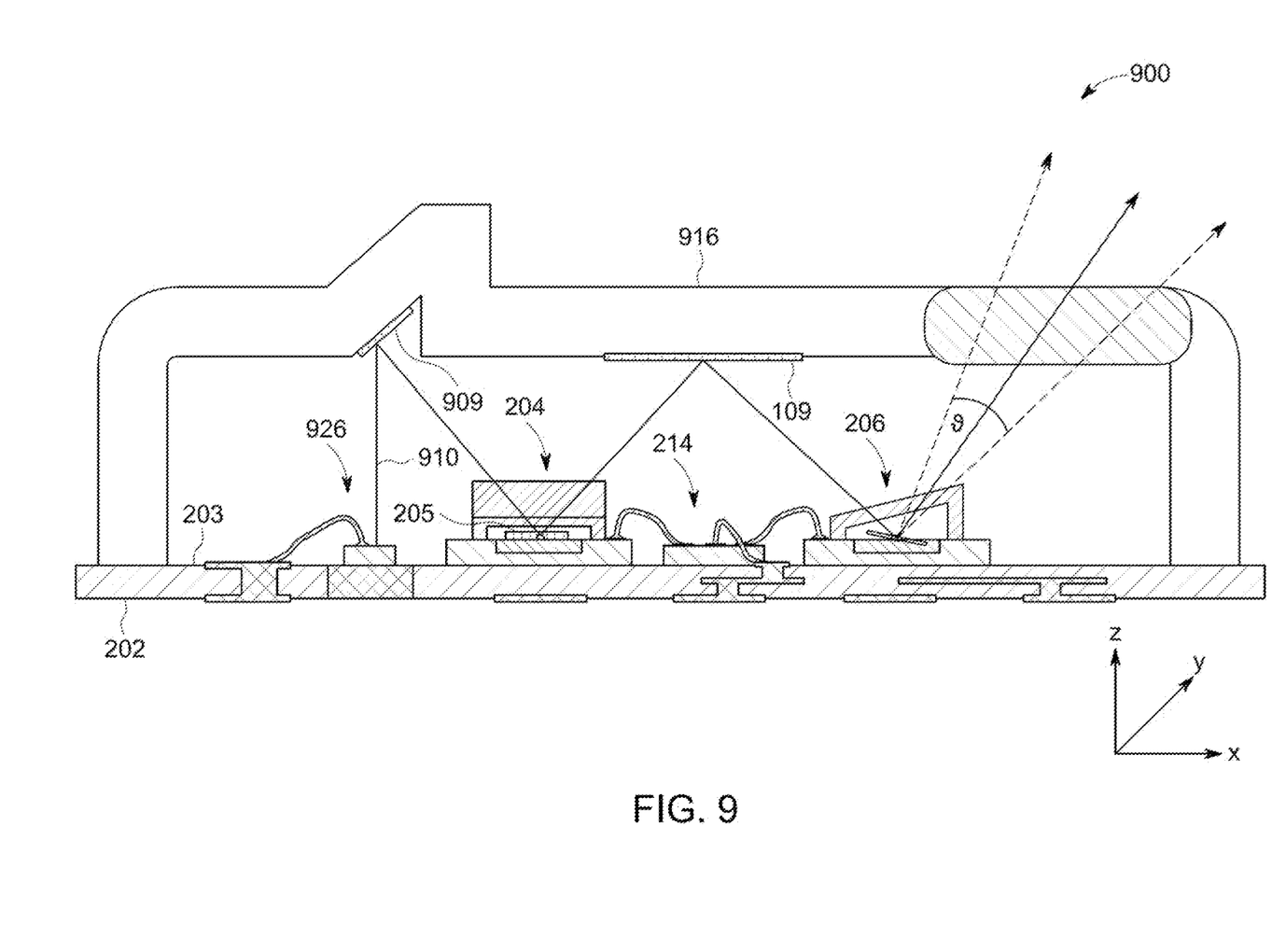
FIG. 9 shows a further example implementation of a mirror system.

FIG. 9 shows a further example implementation of a mirror system 900 which can be implemented in a manner similar to the mirror systems described in association with FIGS. 1-8. The mirror system 900 comprises a radiation source 926 arranged on the surface 203 of the carrier 202 and configured to generate radiation 910 that is incident in the mirror system 900. The housing 916 surrounds the radiation source 926. In comparison with the previous implementations of mirror systems, the radiation source can be part of the mirror system 900. The radiation source can be a laser diode, for example, which can generate (incident) radiation such as IR radiation or (monochromatic) light in the inner region of the housing 916. The radiation source can be a laser with a plurality of modules in order to generate, for example, radiation of different colors (RGB colors). As illustrated in FIG. 9, the mirror system 900 can comprise a further (e.g., second) reflective element 909. The further reflective element 909 can be arranged for example over the surface 203 of the carrier 202 and above the first chip package and the second chip package. The further reflective element 909 can reflect the (incident) radiation 910 generated by the radiation source 926 in the direction of the first MEMS mirror 205. The further reflective element 909 can be similar or identical to the reflective element 109. Parts of the upper region of the housing 916 can be embodied such that they are not parallel to the surface 203 of the carrier 202. The further reflective element 909 can be arranged or embodied on the non-parallel part of the housing 916 in order to able to reflect the generated radiation 910 in the direction of the first MEMS mirror 205.

In some implementations, it is possible to achieve a planar arrangement on a common surface of components (chip packages with MEMS mirrors, control unit, radiation source) in mirror systems. The mirror system 900 could enable a better imaging, projection or scanning, since (incident) radiation 910 generated as a result of integration of the radiation source 926 can reach the first MEMS mirror 205 with fewer scattering losses. The control unit 214 of the mirror system 900 could furthermore be configured to control the radiation source 926 (with regard to a pulse frequency, wavelength of the radiation, intensity of the radiation). With the mirror system 900, an external radiation source could be dispensed with. The mirror system 900 can be a complete system for imaging a radiation or scanning an object. Mirror systems of this type can have a higher integration of components and enable a more compact design. In some example implementations, further components, such as, for example, further control units or sensors, can be integrated in the mirror system.

Further details and optional aspects of the mirror system 900 are described in association with the proposed concept or one or more of the examples described above or below.

Figure 10:
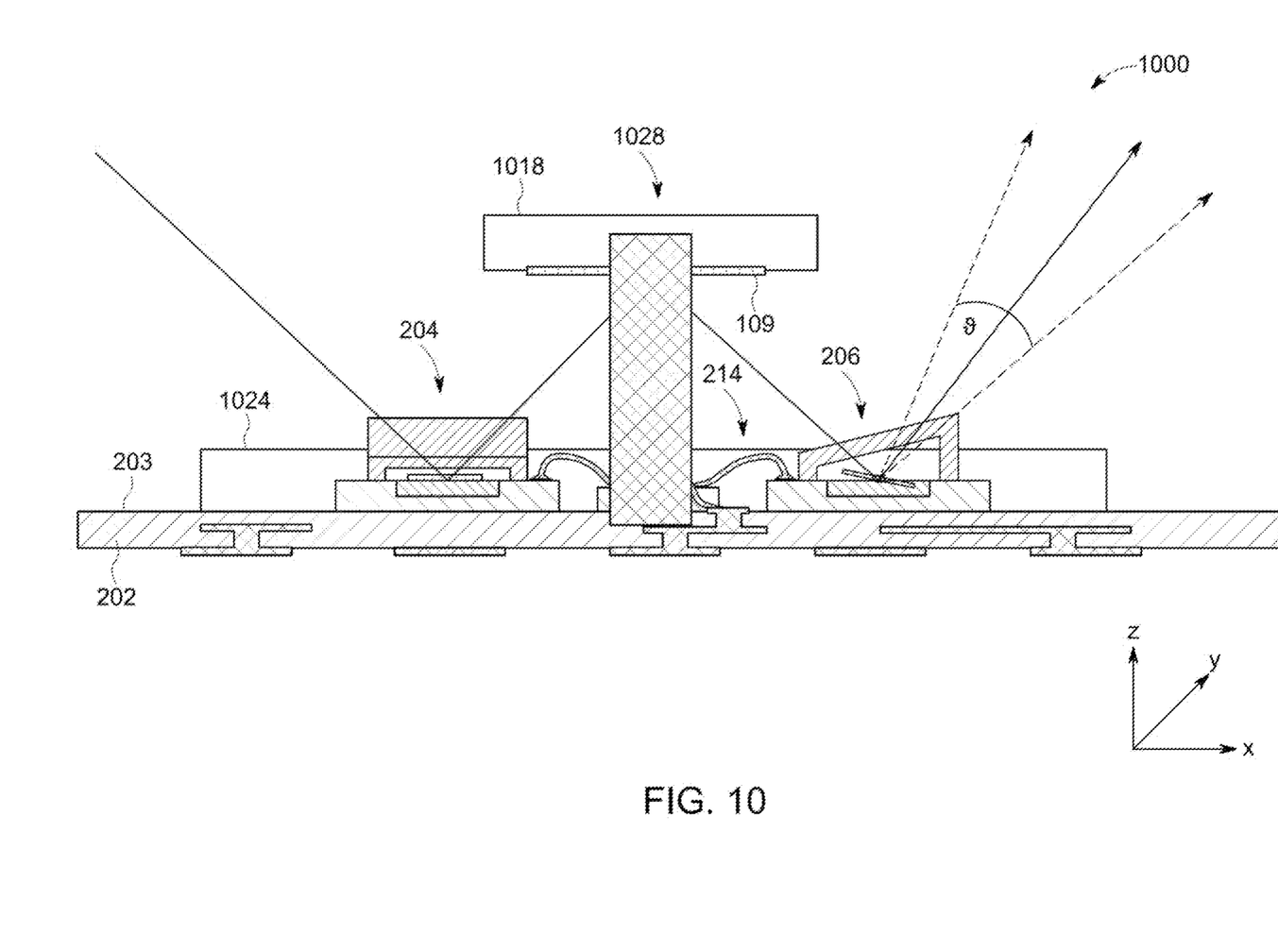
FIG. 10 shows a further example implementation of a mirror system.

FIG. 10 shows a further example implementation of a mirror system 1000. The mirror system 1000 can be implemented in a manner similar to the mirror system 100 described in association with FIG. 1. Furthermore, the mirror system 1000 can have aspects (e.g. with regard to the reflective element, the control unit, the radiation source, the carrier) of the mirror systems described in association with the FIGS. 2-9. The mirror system 1000 comprises a carrying structure 1028 arranged on the surface 203 of the carrier 202, which carrying structure arranges the reflective element 109 above the first and second chip packages 204, 206. The carrying structure 1028 does not surround the first and second chip packages 204, 206. In comparison with the previous implementations described in association with FIGS. 2 to 9, the mirror system 1000 is embodied without a housing. The carrying structure 1028 can have an upper surface 1018, on which the reflective element 109 can be arranged. The upper surface 1018 can be carried by a column of the carrying structure 1028 that is arranged on the surface 203 of the carrier 202. The dimensions of the column perpendicular to the surface 203 can determine the distance between the reflective element 109 and the surface 203. The column or generally the carrying structure 1028 can be embodied and/or arranged in such a way that incident radiation can be reflected without obstruction in or at the mirror system.

By way of comparison with mirror systems having a housing, the mirror system 1000 can constitute an open system and enable a 2D imaging or projection of the incident radiation in accordance with the proposed concept. The mirror system 1000 can have a medium 1024 that protects the contacts of at least the chip packages 204, 206. For example, after being applied to parts of the chip packages, the medium 1024 could cure or solidify and remain on a specific area on the surface of the carrier. In comparison with mirror systems having a housing, the mirror system 1000 could be produced more simply and/or most cost-effectively. Furthermore, maintenance or exchange of components of the mirror system could be carried out or made possible more easily. The mirror system 1000 could be integrated into an existing system (e.g. with radiation source and/or sensor).

Further details and optional aspects of the mirror system 1000 are described in association with the proposed concept or one or more of the examples described above or below.

In accordance with the proposed concept, MEMS mirrors (or micromirrors) and optionally control units (e.g. microcontrollers) and radiation sources can be integrated in a common (semiconductor) device with a common housing.

More accurate scanning could be achieved with the proposed mirror systems. The use of MEMS mirrors makes it possible to accomplish a higher integration at the component level. Proposed mirror systems can be implemented in further systems or products and can be used in combination e.g. for LIDAR.

Mirror systems could be integrated and configured more flexibly. For example, MEMS mirrors of different sizes can be used in order to be able to scan a larger region of an object or surroundings. (Optical) components of the mirror systems and electrical connections could be better protected. By using (inexpensive) standard materials (such as e.g. glass, plastic) for housings and/or carriers, it is possible for mirror systems to be produced cost-effectively.

The aspects and features that have been described in association with a specific one of the examples above can also be combined with one or more of the further examples in order to replace an identical or similar feature of this further example or in order additionally to introduce the feature into the further example.

Examples can relate to a (computer) program comprising a program code for driving the MEMS mirrors when the program is executed on a computer, a processor or some other programmable hardware component. Steps, operations or processes of various methods from among those described above (e.g. for orienting the MEMS mirrors) can thus also be performed by programmed computers, processors or other programmable hardware components. Examples can also cover program storage devices, e.g. digital data storage media, which are machine-, processor- or computer-readable and code or contain machine-executable, processor-executable or computer-executable programs and instructions. The programs storage devices can comprise or be e.g. digital memories, magnetic storage media such as, for example, magnetic disks and magnetic tapes, hard disk drives or optically readable digital data storage media. Further examples can also cover computers, processors, control units, (field) programmable logic arrays ((F)PLAs=(Field) Programmable Logic Arrays), (field) programmable gate arrays ((F)PGAs=(Field) Programmable Gate Arrays), graphics processor units (GPUs=Graphics Processor Unit), application-specific integrated circuits (ASICs), integrated circuits (ICs) or systems-on-a-chip (SoCs) which are programmed to carry out the steps for driving the MEMS mirrors.

It furthermore goes without saying that the disclosure of a plurality of steps, processes, operations or functions disclosed in the description or the claims should not be interpreted as being mandatorily in the order described, unless this is explicitly indicated or absolutely necessary for technical reasons in an individual case. Therefore, the preceding description does not limit the implementation of a plurality of steps or functions to a specific order. Furthermore, in further examples, an individual step, an individual function, an individual process or an individual operation can include a plurality of partial steps, partial functions, partial processes or partial operations and/or be subdivided into them.

Where some aspects in the preceding sections have been described in association with a device or a system, these aspects should also be understood as a description of the corresponding method. In this case, for example, a block, a device or a functional aspect of the device or of the system can correspond to a feature, for instance a method step, of the corresponding method. Analogously thereto, aspects described in association with a method should also be understood as a description of a corresponding block, a corresponding element, a property or a functional feature of a corresponding device or a corresponding system.

The claims that follow are hereby incorporated in the detailed description, where each claim can be representative of a separate example by itself. Furthermore, it should be taken into consideration that—although a dependent claim refers in the claims to a specific combination with one or more other claims—other examples can also encompass a combination of the dependent claim with the subject of any other dependent or independent claim. Such combinations are hereby explicitly proposed, provided that in an individual case no indication is given that a specific combination is not intended. Furthermore, features of a claim are also intended to be included for any other independent claim, even if this claim is not directly defined as being dependent on this other independent claim.

What is claimed is:

1. A mirror system, comprising:
   a carrier;
   a first chip package arranged on a surface of the carrier and comprising a first microelectromechanical system (MEMS) mirror;
   a second chip package arranged on the surface of the carrier and comprising a second MEMS mirror; and
   a reflective element arranged over the surface of the carrier and above the first chip package and the second chip package, wherein a radiation that is incident in the mirror system and is reflected by the first MEMS mirror in a direction of the reflective element is reflected by the reflective element in a direction of the second MEMS mirror.

2. The mirror system as claimed in claim 1, wherein the carrier comprises a printed circuit board.

3. The mirror system as claimed in claim 1, wherein the second MEMS mirror reflects, into surroundings of the mirror system, the incident radiation that is reflected by the reflective element in the direction of the second MEMS mirror.

4. The mirror system as claimed in claim 1, wherein the first MEMS mirror is mounted rotatably about a first axis, wherein the first axis is oriented parallel to the surface of the carrier.

5. The mirror system as claimed in claim 4, wherein the second MEMS mirror is mounted rotatably about a second axis, wherein the second axis is oriented parallel to the surface of the carrier and perpendicular to the first axis.

6. The mirror system as claimed in claim 1, furthermore comprising:
   at least one control unit arranged on the surface of the carrier and configured to control at least one of an orientation of the first MEMS mirror or an orientation of the second MEMS mirror.

7. The mirror system as claimed in claim 1, wherein the first chip package is arranged next to the second chip package on the surface of the carrier.

8. The mirror system as claimed in claim 1, furthermore comprising:
   a housing arranged on the surface of the carrier and surrounding the first chip package, the second chip package, and the reflective element.

9. The mirror system as claimed in claim 8, wherein the reflective element is arranged on an inner side of the housing, wherein the inner side faces the surface of the carrier.

10. The mirror system as claimed in claim 9, wherein at least one part of the inner side of the housing includes a curvature and the reflective element is embodied on the curvature of the at least one part of the inner side.

11. The mirror system as claimed in claim 8, wherein the housing includes a first region, through which incident radiation enters the mirror system, and a second region, through which incident radiation that was reflected by the mirror system emerges from the mirror system.

12. The mirror system as claimed in claim 11, wherein the housing includes an upper surface carried by side walls of the housing and comprising the first region and the second region.

13. The mirror system as claimed in claim 11, wherein the first region and the second region of the housing comprise a transparent material.

14. The mirror system as claimed in claim 11, wherein the first region comprises a first opening in the housing and the second region comprises a second opening in the housing.

15. The mirror system as claimed in claim 1, furthermore comprising:
   a carrying structure arranged on the surface of the carrier, wherein the carrying structure arranges the reflective element above the first chip package and the second chip package, wherein the carrying structure does not surround the first chip package and the second chip package.

16. The mirror system as claimed in claim 1, wherein the reflective element comprises at least one partly transmissive layer, wherein the reflective element is configured to cause the radiation that is incident in the reflective element to be split into at least two beams by multiple reflection at the reflective element.

17. The mirror system as claimed in claim 1, furthermore comprising:
   a medium surrounding at least one part of the first chip package and at least one part of the second chip package to protect one or more contacts of the first chip package and one or more contacts of the second chip package against an influence by surroundings of the mirror system.

18. The mirror system as claimed in claim 1, wherein the first and second chip packages hermetically seal respectively the first and second MEMS mirrors.

19. The mirror system as claimed in claim 1, wherein the first and second chip packages each comprise a transparent cover, incident radiation penetrating to the MEMS mirror through the transparent cover and radiation reflected by the MEMS mirror penetrating through the transparent cover.

20. The mirror system as claimed in claim 19, wherein the transparent cover has a surface that is inclined with respect to the surface of the carrier.

\* \* \* \* \*